July 4, 1939.    G. W. GOOCH    2,164,583
BUCK RAKE
Filed Oct. 4, 1937
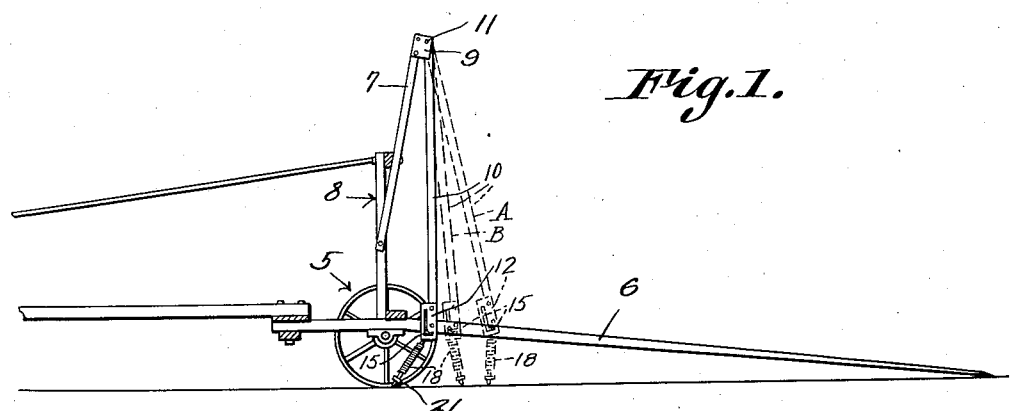
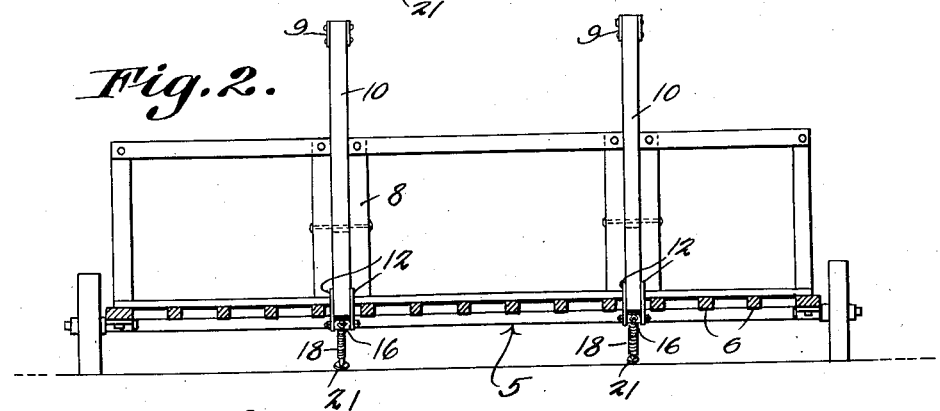
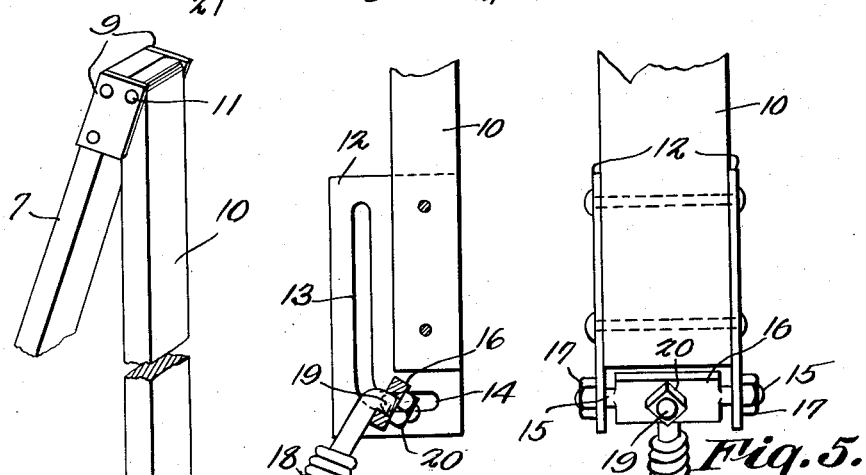
Inventor
G. W. Gooch
By C. A. Snow & Co.
Attorneys.

Patented July 4, 1939

2,164,583

UNITED STATES PATENT OFFICE 2,164,583

BUCK RAKE

Guy Winfield Gooch, Cedarville, Calif.

Application October 4, 1937, Serial No. 167,263

1 Claim. (Cl. 56—395)

This invention relates to an attachment designed for use in connection with farm rakes commonly known as buck rakes, the primary object of the invention being to provide an attachment which will engage the material held on the rake, and hold the material against rearward movement with the rake, when the rake is being moved rearwardly to discharge its load.

An important object of the invention is to provide a device of this character which may be readily and easily mounted on the usual rake frame, eliminating the necessity of making alterations in the rake structure, to mount the attachment.

A still further object of the invention is to provide a device for preventing the material held on the rake from dragging rearwardly with the rake, and one which will automatically set itself for use, after the rake has been unloaded and is moved forwardly to again rake material.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a buck rake, illustrating an attachment constructed in accordance with the invention, as mounted thereon.

Figure 2 is a transverse sectional view through the rake.

Figure 3 is an enlarged perspective view of the attachment.

Figure 4 is a vertical sectional view taken on line 4—4 of Figure 5.

Figure 5 is a front elevational view of the lower end of the attachment.

Referring to the drawing in detail, a buck rake is indicated generally by the reference character 5, and includes the usual rake tines 6, that extend forwardly in a manner to pass under hay or similar material being raked by the rake.

The attachment comprises a supporting bar 7 which is secured to the frame 8 of the buck rake, the supporting bar being extended upwardly from the body portion of the rake, as shown by Figure 1 of the drawing.

At the upper end of the supporting bar 7, and arranged on opposite sides thereof, are plates 9 which plates provide a support for the pivoted bar 10, which is of a length to extend downwardly between adjacent tines 6, of the rake proper. A bolt 11 extends through the plate 9 and through the upper end of the bar 10, providing the pivotal connection between the bar 10 and supporting bar 7.

Secured to the lower end of the pivoted bar 10, and disposed on opposite sides thereof, are plates 12, which are of lengths to extend beyond the lower end of the bar 10. These plates 12 are of widths greater than the thickness of the bar 10, and are provided with slots 13 that have forwardly extended end portions 14. These slots accommodate the shafts or extensions 15 formed at the ends of the plate 16, there being provided nuts 17 on the ends of the extensions 15, for securing the plates 16 in position in such a way that the plates may be free to slide within the groove 13.

The reference character 18 designates a rod which has a right angled end 19 adapted to be extended through an opening in the plate 16, where the rod is provided with a nut 20 for securing the rod in position. This rod is of a length to engage the ground surface when the pivoted bar 10 is in its inactive position, or the position as shown by Figure 1 of the drawing, the rod 18 being inclined slightly rearwardly, when in this position. Near the lower end of the rod 18 is an enlargement 21 adapted to contact with the ground surface and prevent the rod from being driven too far into the ground surface.

In the operation of the device, it will be seen that when the rake is moved rearwardly to discharge its load, the rod 18 will dig into the ground surface as shown in full lines in Figure 1 of the drawing, holding the pivoted bar 10 against rearward movement. Upon further rearward movement of the rake, it will be obvious that the bar 10 will swing to a position as shown in dotted lines and indicated at A in Figure 1 of the drawing, the extensions 15 of the plate 16 moving to the forward ends of the forwardly extended portions of the slots 13 of the plates 12. A portion of the load is now resting on the ground surface in front of the tines 6 of the rake, and upon continued rearward movement of the rake, the load is deposited on the ground surface, and the bar 10 swings rearwardly to a position as shown in dotted lines in Figure 1 of the drawing and indicated at B. In this position, it will be seen that the extensions 15 of the plate 16 now move into the elongated portions of the slots 13.

As the rake is again moved forwardly to collect material, the rod 18 will trail until it becomes necessary to remove the load, whereupon rearward movement of the rake will cause the rod 18 to dig into the ground and bar 10 will be held against rearward movement when the tines are withdrawn from under the load.

While I have described one of these members, it is to be understood that with each buck rake, at least two of these attachments will be used to prevent the rod of the rake from dragging rearwardly with the rake, when being unloaded.

Having thus described the invention, what is claimed is:

A rake embodying a frame, rake tines extending forwardly from the frame, a rake cleaner including vertical bars pivotally mounted on the frame, at the upper ends of the bars, the lower ends of the bars extending between the tines of the rake, spaced plates carried at the lower ends of each bar, said plates having L-shaped slots formed therein, members having extensions, mounted in the L-shaped slots and movable throughout the length of the slots, yieldable rods carried by the members and being of lengths to engage the ground surface over which the rake moves, said rods adapted to move the members forwardly in the L-shaped slots whereby the bars are held against movement, when the rake is backed, and said rods being of a construction to trail, whereby the bars move rearwardly to their normal positions when the rake is moved forwardly under material to be picked up by the rake.

GUY WINFIELD GOOCH.